United States Patent
Civin et al.

(10) Patent No.: US 12,361,299 B2
(45) Date of Patent: Jul. 15, 2025

(54) RELIANCE CONTROL IN NETWORKS OF DEVICES

(71) Applicants: Arm IP Limited, Cambridge (GB); Arm Limited, Cambridge (GB)

(72) Inventors: Damon Jay Civin, San Jose, CA (US); Kevin Olen Gilbert, Austin, TX (US); Lauri Ollinpoika Piikivi, Oulu (FI); Tommi Matias Käsmä, Oulu (FI); Robert George Taylor, Cambridge (GB)

(73) Assignees: Arm IP Limited, Cambridge (GB); Arm Limited, Cambridge (GB)

( * ) Notice: Subject to any disclaimer, the term of this patent is extended or adjusted under 35 U.S.C. 154(b) by 1070 days.

(21) Appl. No.: 17/048,456

(22) PCT Filed: Mar. 22, 2019

(86) PCT No.: PCT/GB2019/050826
§ 371 (c)(1),
(2) Date: Oct. 16, 2020

(87) PCT Pub. No.: WO2019/202290
PCT Pub. Date: Oct. 24, 2019

(65) Prior Publication Data
US 2021/0103836 A1   Apr. 8, 2021

Related U.S. Application Data

(60) Provisional application No. 62/660,548, filed on Apr. 20, 2018.

(30) Foreign Application Priority Data

Jul. 11, 2018   (GB) ...................... 1811374

(51) Int. Cl.
*G06N 5/04* (2023.01)
*G06F 11/07* (2006.01)
(Continued)

(52) U.S. Cl.
CPC ........... *G06N 5/04* (2013.01); *G06F 11/0709* (2013.01); *G06F 11/0793* (2013.01);
(Continued)

(58) Field of Classification Search
CPC .......... G06N 5/04; G06N 20/00; G06N 5/025; G06F 11/0709; G06F 11/0793;
(Continued)

(56) References Cited

U.S. PATENT DOCUMENTS 5,890,143 A * 3/1999 Sakurai .................... G06N 7/02
706/12
7,313,613 B1 * 12/2007 Brooking ............ H04L 41/0631
709/224

(Continued)

FOREIGN PATENT DOCUMENTS

| EP | 3231139 B1 | 2/2018 | |
| WO | WO-2012075336 A1 * | 6/2012 | ............. G06F 21/56 |
| WO | 2015091785 A1 | 6/2015 | |

OTHER PUBLICATIONS

European Patent Office, International Search Report and Written Opinion, PCT/GB2019/05082, May 24, 2019.
(Continued)

*Primary Examiner* — Catherine T. Rastovski
*Assistant Examiner* — Yossef Korang-Beheshti
(74) *Attorney, Agent, or Firm* — Leveque Intellectual Property Law, P.C.

(57) ABSTRACT

A technology provides quantified reliance data for at least one of an electronic computing device node and a connection in network, the technology comprising instrumenting at
(Continued)

least one of the device and the connection to generate datasets comprising at least one of a device feature vector and a connection feature vector, each feature vector being encoded in a form suitable for transmission over a connection in the network; performing computational inferencing over the datasets to generate quantified reliance data comprising at least one of a trust indicator, a diagnostic indicator and a performance indicator associated with at least one of the device and the connection; and supplying the quantified reliance data in a form usable for selecting an action to be performed, the action being performed by or performed to at least one of the at least one electronic computing device node and the at least one connection.

17 Claims, 2 Drawing Sheets

(51) Int. Cl.
  *G06N 20/00* (2019.01)
  *H04L 41/0631* (2022.01)
  *H04L 41/142* (2022.01)
  *H04L 43/0811* (2022.01)

(52) U.S. Cl.
  CPC ......... *G06N 20/00* (2019.01); *H04L 41/0631* (2013.01); *H04L 41/142* (2013.01); *H04L 43/0811* (2013.01)

(58) Field of Classification Search
  CPC ............. G06F 11/3006; G06F 11/3466; G06F 11/2294; H04L 41/0631; H04L 41/142; H04L 43/0811; H04L 67/145; H04L 69/163; H04L 43/0817; H04L 41/16; H04L 41/0883
  See application file for complete search history.

(56) References Cited

U.S. PATENT DOCUMENTS

| | | |
|---|---|---|
| 2006/0291580 A1 | 12/2006 | Horvitz |
| 2008/0201109 A1* | 8/2008 | Zill .................... H04L 41/5009 702/186 |
| 2011/0231704 A1 | 9/2011 | Ge et al. |
| 2015/0120907 A1 | 4/2015 | Niestemski et al. |
| 2017/0104647 A1* | 4/2017 | Chaiyochlarb ......... H04L 43/55 |
| 2017/0155544 A1 | 6/2017 | Khanna et al. |
| 2017/0351241 A1* | 12/2017 | Bowers ................ G05B 19/406 |
| 2019/0245754 A1* | 8/2019 | Greene, Jr. ........... H04L 41/145 |
| 2020/0012483 A1* | 1/2020 | Nassaur .................. G06F 9/541 |

OTHER PUBLICATIONS

S. Tan, D. De, W. Song, J. Yang and S. K. Das, "Survey of Security Advances in Smart Grid: A Data Driven Approach," in IEEE Communications Surveys & Tutorials, vol. 19, No. 1, pp. 397-422, Firstquarter 2017, doi: 10.1109/COMST.2016.2616442.

* cited by examiner

RELIANCE CONTROL IN NETWORKS OF DEVICES

CROSS-REFERENCE TO RELATED APPLICATIONS

This application is a National Stage of International Patent Application Serial No. PCT/GB2019/050826 (filed on Mar. 22, 2019), which claims the benefit of U.S. Provisional Patent Application Ser. No. 62/660,548 (filed on Apr. 20, 2018), and which claims priority to foreign patent application serial no. GB 1811374.6 (filed on Jul. 11, 2018), the contents of which are incorporated herein by reference in their entireties.

BACKGROUND

The present technology relates to methods and apparatus for providing quantified reliance data for electronic data apparatus and network connections and applying inferences from that reliance data in controlling system behaviour.

In a conventional computing environment, it may be possible to establish a closed system in which considerable reliance can be placed on every element of the system—for example, in a traditional closed machine room with connectivity only to devices within an organisation, in which changes to software and hardware can be performed only by authorised staff of the organisation after substantial testing and verification, in which the status and performance of the system's components is monitored over channels that are not capacity constrained, and in which all inbound data is checked before input to the system. Such computing environments are no longer the norm. In modern computing environments, it is not always clear how much reliance can be placed on any specific device or connection, how the data to support a reliance assessment can be gathered and transmitted without undue impact on the device or the network, and how that reliance can be quantified and rendered usable to assist in controlling the components of the computing environment.

As the computing art has advanced, and as processing power, memory and the like resources have become commoditised and capable of being incorporated into objects used in everyday living, there has arisen what is known as the Internet of Things (IoT). Many of the devices that are used in daily life for purposes connected with, for example, transport, home life, shopping and exercising are now capable of incorporating some form of data collection, processing, storage and production in ways that could not have been imagined in the early days of computing, or even quite recently. Well-known examples of such devices in the consumer space include wearable fitness tracking devices, automobile monitoring and control systems, refrigerators that can scan product codes of food products and store date and freshness information to suggest buying priorities by means of text messages to mobile (cellular) telephones, and the like. In industry and commerce, instrumentation of processes, premises, and machinery has likewise advanced apace. In the spheres of healthcare, medical research and lifestyle improvement, advances in implantable devices, remote monitoring and diagnostics and the like technologies are proving transformative, and their potential is only beginning to be tapped.

DRAWINGS

Implementations of the disclosed technology will now be described, by way of example only, with reference to the accompanying drawings, in which.

DETAILED DESCRIPTION

Figure 1:
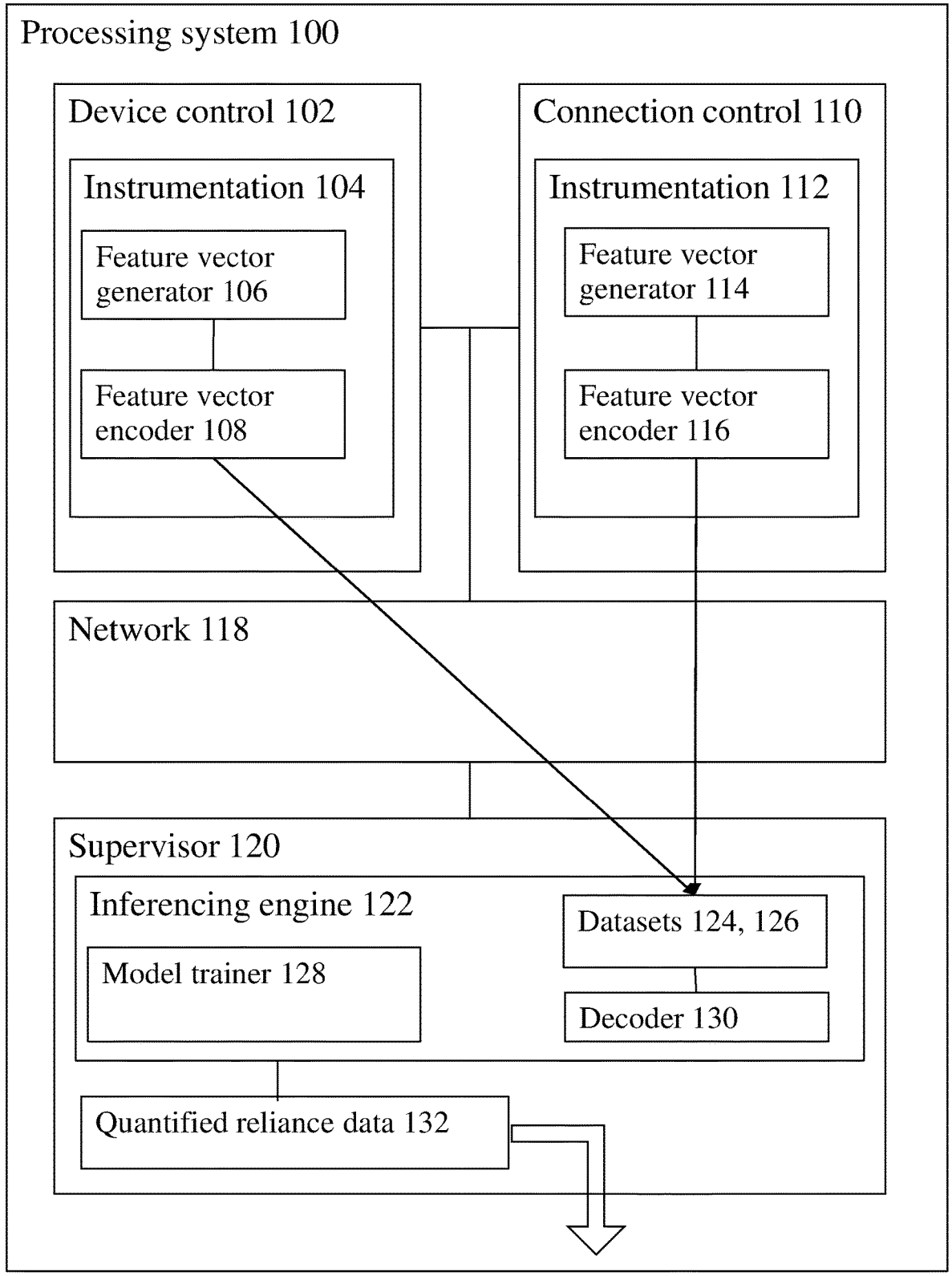
FIG. 1 shows a block diagram of an arrangement of logic, firmware or software components by means of which the presently described technology may be implemented.

In an IoT environment, there may be many operational devices and many network connections. It is desirable to know, at a higher level, such as a cloud system level, state information concerning the devices, to enable central determinations to be made concerning the level of reliance to be placed on any device or connection, and thus to allow appropriate actions to be taken in controlling them. However, many IoT devices are in some way constrained: for example in processing capability, network access, or battery power, and the network connections may also be constrained in terms of continuity of connectedness, quality of service, and the like. It is thus important that any state data (or metadata) concerning the state of devices and connections be processed and communicated in such a way as to minimise its consumption of constrained resources and thus minimise its interference with the real business of the devices and connections, which is, of course, to process and communicate user or customer data. The user or customer data must also be kept isolated from the metadata for reasons of security—customers, understandably, do not want their business information to be exposed in a monitoring or control flow.

"Reliance", in the present technological context, refers not only to conventional reliability-availability-serviceability (RAS) characteristics but also to more subtle estimates of the position of a device or network connection on a spectrum of trustworthiness, system health and/or system performance. In the case of a device that is used as a data source, its measure of reliance may be affected by RAS characteristics of its physical and logical components (hardware and software), but may also be significantly affected by such factors as the frequency with which the device can update its data, its susceptibility to environmental noise, its likelihood of sustaining soft errors (such as temporary shortage of memory space), and many other factors. In the case of a network connection, again, RAS is a factor, but so also are such things as potential network attack surfaces for the malicious, intermittency of connectivity, likelihood of packet drop, presence of channel noise, and the like.

In a first approach to the many difficulties encountered in controlling system behaviour in modern computing environments, there is provided a computer-implemented method for providing quantified reliance data for at least one of a device in a plurality of electronic computing device nodes and a connection in a plurality of connections of a network, the method comprising instrumenting at least one of the device and the connection to generate at least two datasets each said dataset comprising at least one of a device feature vector and a connection feature vector, each feature vector being encoded in a form suitable for transmission over a connection in the network; performing computational inferencing over the at least two datasets to generate quantified reliance data comprising at least one of a trust indicator, a diagnostic indicator and a performance indicator associated with at least one of the device and the connection; and supplying the quantified reliance data in a form usable for selecting an action to be performed, the action being at least one of performed by and performed to at least one of the at least one electronic computing device node and the at least one connection.

Seen from a different perspective, there is provided computer-implemented method for generating at least one dataset for analysis by an inferencing engine, the method comprising monitoring at least one of a device in a plurality of electronic computing device nodes and a connection in a plurality of connections of a network; generating at least one of a device feature vector and a connection feature vector; encoding the or each feature vector in a form suitable for transmission over a connection in the network; and transmitting the or each feature vector to a system comprising an inferencing engine, the or each feature vector being formatted into a dataset to permit computational inferencing to generate quantified reliance data comprising at least one of a trust indicator, a diagnostic indicator and a performance indicator associated with at least one of the device and the connection.

From a yet further perspective, there is provided a computer-implemented method for providing quantified reliance data for at least one of a device in a plurality of electronic computing device nodes and a connection in a plurality of connections of a network, the method comprising receiving from at least one of the device and the connection at least one of a device feature vector and a connection feature vector, the or each feature vector being encoded in a form suitable for transmission over a connection in the network; generating at least two datasets each comprising at least one of a device feature vector and a connection feature vector; performing computational inferencing over the at least two datasets to generate quantified reliance data comprising at least one of a trust indicator, a diagnostic indicator and a performance indicator associated with at least one of the device and the connection; and supplying the quantified reliance data in a form usable for selecting an action to be performed, the action being at least one of performed by and performed to at least one of the at least one electronic computing device node and the at least one connection.

In a hardware implementation of the present technology, there is provided electronic apparatus comprising logic components operable to implement the methods of the present technology. In a computer program product implementation, there is provided computer code operable, when loaded into a computer and executed thereon, to cause the computer to operate logic circuitry to perform the methods of the present technology.

Broadly, then, the present technology provides the ability for devices and network connections to be instrumented to generate feature vectors comprising efficiently-represented state data that can be communicated to one or more analytics engines capable of inferencing to derive quantified reliance data that can be acted upon to select actions to be taken with respect to the devices and network connections, examples of such actions being restoring or improving the "health" of the components of the computing environment. The present technology thus combines metadata concerning the live operational state of devices, such as IoT devices, with other metrics that are reflective of the state of the networks across which data is flowing. This aggregation of metadata from different sources enables systems, such as cloud services having access to the aggregated data, to apply inferencing so that more informed decisions can be taken as to actions required to address trust, error and performance conditions.

It will be clear to one of skill in the art that the present technology is located, of necessity, at the system control level of the computing stack. This may be at or beneath the operating system supervisory layer, because the control actions to be taken as a result of the application of the present technology are typically privileged actions not available to ordinary system users and applications.

In implementations directed to IoT devices connected via the cloud, the present technology provides for combining metadata concerning the live operational state of IoT devices with other wider metrics that are reflective of the state of the networks over which the data is provided to the cloud service. The metadata is then available for use by a decision engine or the like to make decisions as to what actions should be taken by a control or management system. The need for such a combination of metadata will be clear to one of ordinary skill in the art. For example, the state of a connection between a device and a management system can only be properly understood from the perspectives of both endpoints—there can be issues that affect only the traffic going in one direction, and this may not be immediately evident if single endpoint data is considered in isolation.

In FIG. 1, there is shown a block diagram of an exemplary processing system 100 comprising logic components, firmware components or software components, with associated storage, by means of which the presently described technology may be implemented. Processing system 100 may comprise a single site installation having a few devices connected by way of a local area network, for example, or it may comprise the entire Internet of Things and all associated servers, cloud networks and grid or mesh attached systems.

Processing system 100 comprises a plurality of devices and connections, each of which has a control entity. Devices may comprise end-point nodes in a network, and may also comprise intermediate nodes, such as gateways, routers and the like, when seen as devices in their own right. Their control entities are shown in the present simplified representation as device control 102 and connection control 110. Device control 102 and connection control 110 are connected to network 118 and are provided with instrumentation 104, 112 (that is, hardware, firmware or software logic that acts independently of the main processing tasks of the device or connection, and which is intended to monitor how the device or connection performs its work). The instrumentation 104, 112 comprises feature vector generators 106, 114 operable to construct feature vectors representing state data for devices and connections. The state data in a device feature vector may include, for example, physical state data such as a device power state, a device process state, a device error state, a device connectivity state, and the like. The state data in a device feature vector may also include state logical data, such as a software image state, a software library state, a software usage statistical value, a software error state and the like. The state data in a connection feature vector may also include a network size, a network connectivity state, a network error state, a network packet transport state, a network quality-of-service state, and the like.

As will be clear to one of skill in the art, the aggregation of such state data may be rather extensive, and given the memory and power limitations on many devices (especially IoT devices) and bandwidth and connectivity time limitations on many connections, this may be problematic. The present technology addresses this matter by providing instrumentation 102, 112 with feature vector encoders 108, 116, which are operable to transform feature vectors into a form suitable for handling by constrained devices and connections. The transformed feature vectors are encoded in such a way that they are clearly distinct from normal user or customer data, and so that they cause minimal disruption to the normal processing conducted by the devices and connections. If the state of the device is known, the amount of metadata gathered and transmitted can be dynamically adjusted. For example, the device may be used to gather additional feature vector data while it is not busy with user tasks, or it may be adjusted to send less metadata while the system is behaving normally, and then send more metadata if any anomalous behaviour is detected.

In addition, devices themselves are often restricted in their power availability, and as is well known, data communications consumes lot of energy. There is a continuing need to transmit the application data, the main focus of any IoT system, and the supporting metadata is an additional load on the communications channel. The metadata collection in the device can be appended to application protocol in a way that metadata is only sent if there is application data to send. This saves energy in the device as it is more efficient to send data in one go compared to activating a channel, such as a radio channel, separately. To minimize communication costs, there can be selection of the metadata. Metadata can have different priority and value in different networks and devices. For example, a mains powered Ethernet device can send all metadata, but for a battery powered device in a narrowband network only the sleep time of the device may be deemed interesting. The metadata service can select different data, different level of detail for logs in the devices. Based on earlier results the data collected can be tailored to be different statistical reliability, or to be still business risk acceptable.

Device control 102 and connection control 110 are operable to transmit feature vectors across network 118 to a supervisor 120 (which may be implemented in any of many possible forms, as will be clear to one of skill in the art, but will also be described further hereinbelow). Supervisor 120 is operable to construct, store and process datasets 124, 126, which are populated with feature vectors supplied as described above by device control 102 and connection control 110. Datasets 124, 126, which were encoded in a form suitable for transmission across the network, are decoded by decoder 130. Supervisor 120 comprises a model trainer component 128 that is operable to apply machine learning techniques to datasets 124, 126 to derive inferencing rules from the feature vectors and to enable inferencing engine 122 to apply the rules to further feature vectors from datasets 124, 126 to generate quantified reliance data 132. The quantified reliance data 132 may comprise, among other things, trust indicators, diagnostic indicators and performance indicators associated with devices and connections, in a form in which it may be acted upon by decision engines to control operations to be performed by or to devices and connections within processing system 100. One possible action, for example, is to shut down a device that appears to be misbehaving or to restrict the amount of network or CPU time allowed to a device or thread. The arrangements of data in datasets 124, 126 may vary, typically according to the use to which the information derived from them is to be put. Device and connection feature vector data may thus be arranged in the datasets 124, 126 in ways that facilitate historical comparison of a device's behaviour with its past behaviour, or in ways that permit feature vector data from similar devices to be compared, and so forth. Feature vector data in the datasets 124, 126 may also be grouped into subsets to facilitate categorization and analysis.

Model trainer component 128 may be configured to operate in a continuing relationship with inferencing engine 122 by receiving "live" feedback from inferencing engine 122 and changing an existing model in response. Thus, the relationship between model trainer component 128 and inferencing engine 122 may be made operable to refine the generation of quantified reliance data 132 during operation of the system.

Examples of the kind of metadata capturable from a device, such as an IoT device, that can be used to make inferences about the status of the device include:
  Data relating to CPU status, such as:
    CPU load;
    CPU restarts;
    Stack pointers; and
    Forks.
  Data relating to device memory status, such as:
    Memory usage data;
    Memory writes;
    Memory calls; and
    Out-of-memory events;
  Data relating to device power status, such as:
    Battery usage; and
    Power cycling statistics.
    time spend in different active and sleep states on the MCU
  Process and thread data
    Numbers of processes and threads
    Activation counts and active times
    Interrupt counts per source
  Data relating to operating system status, such as:
    Operating system and hardware versions;
    Operating system crashes; and
    Boot data.
  Data relating to connectivity status, such as:
    Connectivity up-time; and
    Connectivity usage; and
    Connection events (IP addresses, ports, and timestamps).

In one example use case, using the present technology to compare the data from similar devices and noticing abnormal boot counts (low uptime) or abnormal thread activity it is possible to identify a device that may have malfunctioning hardware, for example bad soldering affecting the operation of the device.

The present technology also makes it possible to gather and understand metadata concerning the logical state of the device, such as, for example, the compilation process that generated the software image provided to the IoT device and running thereon. For example, compilation metadata may include:
  data relating to map files and binaries;
  used libraries and SW components in the build; and
  the storage space those libraries take (which can be interpreted as
  an indication of any sub-features and optimizations used).

The present technology makes it possible to map device behaviour to software components (for example, in a known IP stack, it is possible to determine how a software component behaves in different environments) and to make inferences to improve the logical operation of the device, or to provide guidance as to the selection of logical components that better matches a particular environment. This provides, for example, anonymous usage statistics of different components and their versions to help in optimising deployments of software and firmware. It also permits detection of infrequently occurring bugs in specific components and their versions by correlating data across a deployed population of software or firmware, making it possible to, for example, notify customers who may be impacted, once a problem in a certain component or version is detected. The fine-grained nature of the metadata that can be gathered and analysed in the present technology permits the identification of errors and their association with specific compiler and version information.

Diagnosis of a device can include a device-located software component that can run different tests on the hardware. A remote server can instruct the device to execute these tests and collect the results. Tests may mean that the device cannot execute its application level real functionality. There can be a cryptographic token asked from the application server, that the device application verifies to allow this disruptive testing. Boot SW of the device may include low level tests. The results can be saved in persistent RAM area or NVM memory, where the diagnostics software can find the results and report them to the server. Utilizing the ability to flash a device, the device can be flashed with a diagnostics test software component, executing there and reporting back to server. After the tests the business application can be reloaded to the device, so that normal service can be resumed.

The management system, such as the cloud platform, can correlate information from different customer devices based on the CPU and memory types and models. Then, as new customers enroll into the system, there is already an expected profile of hardware behaviour that can be used, so that any differences from expected hardware reliability, for example, can be managed appropriately. The system can, for example, import test time device metadata. The profile would include the expected memory usage, thread operation, network communication patterns to which the real deployment devices collected data can be compared. The device profiles can be generated with destructive testing, for example running the memory writes until the memory fails. The data can be used to monitor real devices.

The present technology is further operable to capture metadata relating to the network through which data from the devices passes for processing. For example, if an IoT device forms part of a mesh network, metadata concerning the current operating status of the mesh network may also be captured and conveyed to a system management entity at the cloud service. This network operating status metadata may include one or more of the following fields:
  Communication timeout metadata;
  Communication link quality metadata;
  Mesh network size;
  Metadata relating to packets, such as:
    Packet size;
    Number of packets sent;
    Number of packets received;
    Number of packets dropped; and
    Number of packets retried.

Metadata relating to the operating state of the device may thus be analysed in combination with metadata relating to the operating state of the mesh network to aid in determining whether the behaviour of the device is related to the operating state of the mesh network in such a manner as to give useful information for controlling the device or the network.

In another example, an IoT device may be connected via a cellular network. Examples of network-related state data that may be captured for a cellular network are:
  Metadata relating to sleep times;
  Metadata relating to connection timers;
  Metadata relating to packets, such as:
    Packet size;
    Number of packets sent;
    Number of packets received;
    Number of packets dropped; and
    Number of packets retried.

In addition to the broad information relating to the operating status of the network as a whole, it is also possible to obtain metadata concerning specific entities in the network. For example, where the network comprises one or more gateways it may be possible to determine operating data concerning that gateway. Similarly, metadata concerning the cloud service itself can also be used to feed into the analysis.

Figure 2:
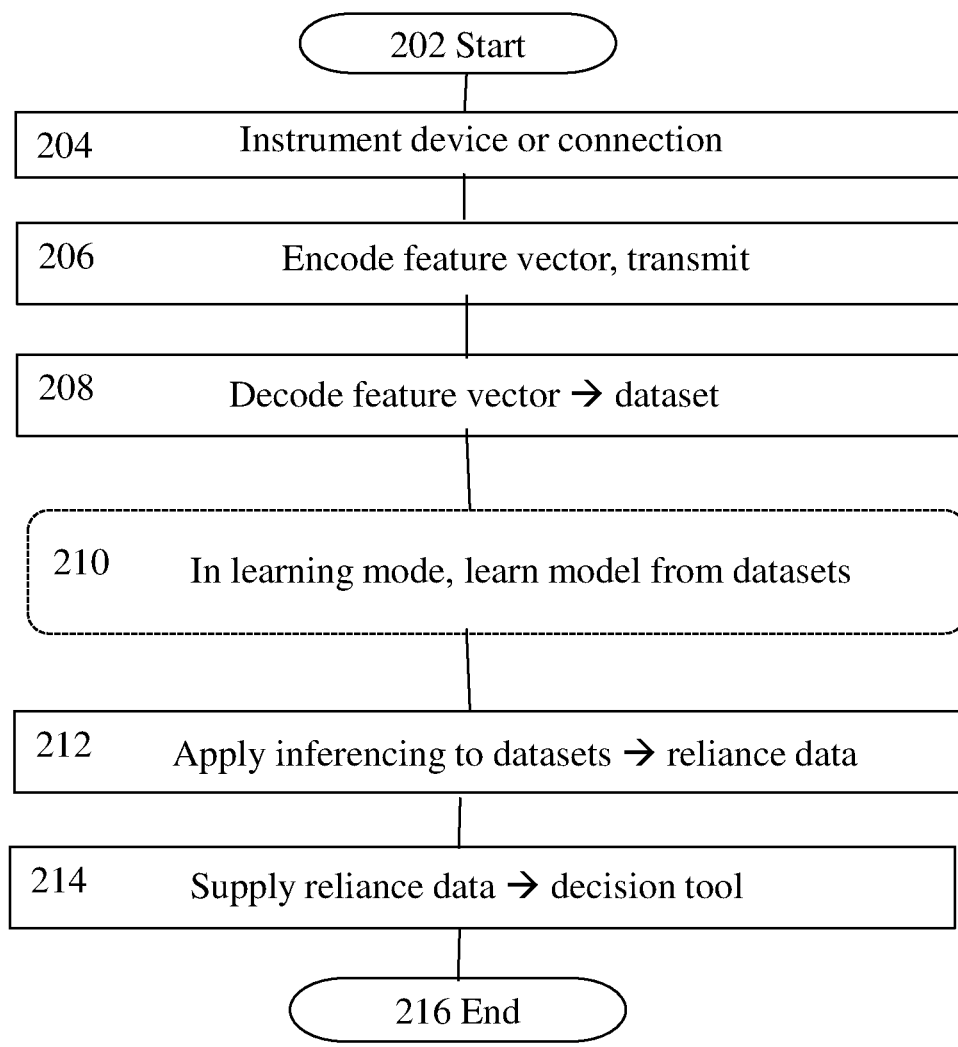
FIG. 2 shows an example of a computer-implemented method according to the presently described technology.

Turning now to FIG. 2, there is shown a method 200 according to the present technology. Method 200 begins at START 202, and at 204 a device or connection is instrumented to generate datasets of device and connection feature vectors. As previously briefly discussed, the generation of these feature vectors needs to be done with the least possible impact on the normal running of the device or connection—for example, using the smallest possible memory footprint and the fewest possible CPU cycles commensurate with the production of useful data. At 206, a device or connection feature vector is encoded into a form suitable for transmission over a network connection, and again, as described above, normal running of the connection to carry user or customer data must take priority—thus the encoding must be such as to communicate the necessary amount of usable device or connection state information, whether that amount be large or small, in the smallest possible package. It is thus necessary to select an appropriately economical encoding for each of these feature vectors. The feature vectors, having been generated, are thus encoded and passed to the datasets over the network.

The amount of data generated in a device typically varies based on external environment. Thus, there can be varying amounts of space available for the metadata. Devices can have configurable priorities how to select the metadata to send in the allocated space. The system can also configure the devices to do statistical analysis of the metadata, so that only the e.g. only average, minimum, maximum, median, standard of deviation of a value is sent. Devices can also learn or be configured to detect interesting, anomalous statistics or events and report those. Based on learned indicators of failure or indicators of security breach, the system can configure the devices with different fingerprints of interesting data. For example, the device can be configured with a certain pattern of messages in diagnostic log to trigger an alert, because that pattern has been seen in failed devices.

At 208, the feature vectors are decoded from their transmission format into a form usable by an inferencing engine. When the system is in learning mode, a model is derived 210 from the datasets to provide inferencing rules to the inferencing engine. The learning mode may be invoked prior to "live" operation of the system, or it may continue during "live" operation. At 212, at least two of the datasets are subjected to a process of computational inferencing to generate quantified reliance data. The inferencing may take any of several forms. For example, by deriving a set of behavioural norms for a particular device type and comparing with a recent time-series of increasingly-frequent outlier values, it may be inferred that a device is in the process developing a fault. The quantified reliance data for the device may be affected, and/or, if the device's behaviour has an influence on the network, the connection's quantified reliance data may change. This is a trivial example—in the current state of artificial intelligence systems, much more subtle and sophisticated computational inferences may be derived from the data in the datasets of device and connection feature vectors.

Thus, the derivation of the model 210 and the computational inferencing 212 may be performed as a continuing process so that feedback from the computational inferencing 212 may be used to periodically or continuously refine the model 210.

At 214, the quantified reliance data is supplied in a form that is usable by, for example, a decision support system to select an action to be taken—this might be an action such as triggering additional diagnostic monitoring, or it might, responsive to poor reliance value because of a security issue exposed in the feature vector data, involve the quarantining of a device or a subnet of a network. Other examples include failure root-cause analysis, one or more error-corrective processes, performance optimisation processes, data source or connection selection processes, and the like. The process concludes at END 216, but is likely to be iterative, as would be clear to one of ordinary skill in the art. Given the iterative nature of the process, an additional refinement becomes possible, in that the entire process of providing quantified reliance data may itself be instrumented to provide auditability (the ability to show how and why the data supported the decisions that were taken) and process introspection of said monitoring and said performing computational inferencing, to allow the monitoring and inferencing processes to be improved over time on the basis of true data extracted during live system executions.

In typical use cases for the present technology, some of the following factors are significant:

Operational efficiency over system or deployment lifecycle
  Can provide real deployment data parameters and operational data as feedback for ongoing system and component design and development.
  Can save battery & improve reliability by configuring device settings based on deployment statistics (e.g. Learn network operators TCP/UDP connection timeout and set keep-alive message at optimal rate).
  Can improve testing by using deployment network and test network statistics on device behaviour.
Diagnostics
  Can help solve deployment issues, especially updates, save time & better service:
  Can indicate which devices need replacement/upgrade based on behaviour analysis compared to similar devices in same or corresponding network conditions.
  Can help plan maintenance based on rate of failure statistics.
  Can enable developers to build new services on the device and connection platforms.
Trust & Security
  Can detect and help to mitigate threats or failures caused by compromised devices.
  Can help improve machine learning performance by providing training data quality indicators.
  Can help to detect and respond to data served by tampered devices, such as smart meters.

In a more sophisticated use case, users may have an application that can be deployed to devices (such as air quality sensors) that enables the devices to use different available communication mechanisms to report the data. Metadata from the devices and networks enable the system to be configured separately for the different technologies, and even for different devices based on the networking environment that individual device operates in.

In another sophisticated use case, it is known that each mobile operator configures their mobile network to best serve their users and manage the network capacity in certain areas. However, this can mean that a TCP connection without traffic can be kept alive in operator networks for different periods of time—some operators may keep connections alive for seconds, others for minutes or hours. If an application needs to be able to receive messages all the time, it must send keep-alive messages to the network to keep the TCP connection alive. By combining live operating status data for the device (such as battery usage, CPU usage, TCP message information, and the like) with network operating state information (such as TCP connection timeout data) it is possible to learn a particular TCP connection setting for a particular operator and to modify the behaviour of the device keep-alive messages to match the network. Having a detailed analysis of the device data is helpful in this respect. A large number of keep-alive messages uses a significant amount of battery power and CPU cycles—the present technology can assist in, for example, minimising the resource use to extend battery life, or it can be tuned to send a "last gasp" before battery runs out if the device metadata is understood in detail.

In one implementation, the present technology can be used for cloud-initiated firmware update. During testing of a cloud update, it may be observed that only some of the devices have been updated. Where devices have the same software and hardware, and only a subset of the devices could be updated, it might be difficult to diagnose the problem. For example, is the new version buggy or compromised in some way? Is it using too much memory? Is it killing the battery, or preventing writes to disk by using too much CPU? The device and connection metadata described herein can be used to provide for the application of inferencing to assist in determining the root cause and providing actions to remedy the problem.

As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Furthermore, the present technique may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A computer-implemented method for providing quantified reliance data for a device in a plurality of electronic computing device nodes the method comprising:
   instrumenting said device to generate at least two datasets comprising at least one device feature vector, each said feature vector being encoded in a form suitable for transmission over a connection in said network, said instrumenting comprising generating a device feature vector representing at least one device logical state selected from a software library state, a software usage statistical value, and a software error state;
   performing computational inferencing over said at least two datasets to generate quantified reliance data comprising at least one of a trust indicator, a diagnostic indicator and a performance indicator associated with said device;
   supplying said quantified reliance data in a form usable for selecting an action to be performed, wherein said supplying said quantified reliance data comprises signalling to a decision engine for a data source selection process, the decision engine operable to use said supplied quantified reliance data to select an action, said action being at least one of a shut down or a quarantine of said device; and
   performing the selected action by and to said electronic computing device node in accordance with the decision engine selection.

2. The method of claim 1, said generating at least two datasets comprising generating a normal behaviour history dataset and a current dataset for comparison with said normal behaviour history dataset.

3. The method of claim 1, further comprising training a model for said performing computational inferencing over said at least two datasets to generate quantified reliance data.

4. The method of claim 3, said performing computational inferencing further comprising providing feedback to said training a model.

5. The method of claim 4, said training a model further comprising changing an existing said model in response to said performing computational inferencing providing said feedback.

6. The method of claim 1, said supplying said quantified reliance data comprising supplying at least one of a trusted state indicator, an error diagnostic indicator and a performance indicator.

7. The method of claim 1, said instrumenting comprising generating a device feature vector representing at least one device physical state selected from:
   a device power state;
   a device process state;
   a device error state; and
   a device connectivity state.

8. The method of claim 1, said instrumenting further comprising each said feature vector being encoded in a form suitable for transmission over a connection in said network by encoding to at least one of:
   reduce memory footprint of said feature vector;
   reduce bandwidth required for transmission of said feature vector; and
   reduce processor cycles required for processing said feature vector.

9. The method of claim 1, further comprising storing said quantified reliance data for auditing of said selecting.

10. The method of claim 1, further comprising storing said quantified reliance data for process introspection of said monitoring and said performing computational inferencing.

11. The method of claim 10, said process introspection being operable to refine said monitoring and said performing computational inferencing.

12. An electronic apparatus comprising logic operable to provide quantified reliance data for a device in a plurality of electronic computing device nodes, the apparatus comprising:
   instrumentation logic implemented in said device and operable to generate at least two datasets comprising at least one device feature vector, each said feature vector being encoded in a form suitable for transmission over a connection in said network, said instrumentation logic operable to generate a device feature vector representing at least one device logical state selected from a software library state, a software usage statistical value, and a software error state;
   computational inferencing logic operable to perform inferencing over said at least two datasets to generate quantified reliance data comprising at least one of a trust indicator, a diagnostic indicator and a performance indicator associated with said device; and
   communication logic operable to supply said quantified reliance data in a form usable for selecting an action to be performed, wherein said supplying said quantified reliance data comprises signalling to a decision engine for a data source selection process, the decision engine operable to use said quantified reliance data to select an action and cause the action to be performed, said action being at least one of a shut down or a quarantine of said device and performed by and performed to said electronic computing device node.

13. A computer program product comprising computer code stored in a tangible storage medium and operable, when loaded into a computer and executed thereon, to cause said computer to operate logic circuitry to:

instrument at least one device to generate at least two datasets comprising a device feature vector, each said feature vector being encoded in a form suitable for transmission over a connection in said network, said instrumenting comprising generating a device feature vector representing at least one device logical state selected from a software library state, a software usage statistical value, and a software error state;

perform computational inferencing over said at least two datasets to generate quantified reliance data comprising at least one of a trust indicator, a diagnostic indicator and a performance indicator associated with said device;

supply said quantified reliance data in a form usable for selecting an action to be performed, wherein said supplying said quantified reliance data comprises signalling to a decision engine for a data source selection process, the decision engine operable to use said supplied quantified reliance data to select an action, said action being at least one of a shut down or a quarantine of said device; and perform the selected action by and to said electronic computing device node in accordance with the decision engine selection.

14. The computer program product of claim 13, said computer code further operable, when loaded into a computer and executed thereon, to cause said computer to operate logic circuitry to generate at least two datasets comprising generating a normal behaviour history dataset and a current dataset for comparison with said normal behaviour history dataset.

15. The computer program product of claim 13, said computer code further operable, when loaded into a computer and executed thereon, to cause said computer to operate logic circuitry to train a model for said performing computational inferencing over said at least two datasets to generate quantified reliance data.

16. The computer program product of claim 15, said computer code further operable, when loaded into a computer and executed thereon, to cause said computer to operate logic circuitry to provide feedback to said logic circuitry to train a model.

17. The computer program product of claim 16, said computer code further operable, when loaded into a computer and executed thereon, to cause said computer to operate logic circuitry to change an existing said model in response to said logic circuitry providing said feedback.

* * * * *